United States Patent [19]
Bech

[11] Patent Number: 4,839,548
[45] Date of Patent: Jun. 13, 1989

[54] ADJUSTABLE ROLLER DYNAMO WITH TORSION SPRING

[75] Inventor: Hans Bech, Fröndenberg/Ruhr, Fed. Rep. of Germany

[73] Assignee: Union Sils, Van de Loo & Co., Frondenberg/Ruhr, Fed. Rep. of Germany

[21] Appl. No.: 167,566

[22] Filed: Mar. 14, 1988

[30] Foreign Application Priority Data

Mar. 14, 1987 [DE] Fed. Rep. of Germany ....... 8703886

[51] Int. Cl.[4] .......................... H02K 5/26; F16F 1/06
[52] U.S. Cl. .................................. 310/67 A; 267/155; 267/177; 310/91
[58] Field of Search ............... 310/67 A, 91; 267/154, 267/155, 177, 275

[56] References Cited

U.S. PATENT DOCUMENTS 2,767,735 10/1956 Darling ............................... 267/155
3,145,983 8/1964 Higbee ................................ 267/177

FOREIGN PATENT DOCUMENTS 322630 7/1920 Fed. Rep. of Germany ........ 362/72
810739 3/1959 United Kingdom ................ 267/155

Primary Examiner—William H. Beha, Jr.
Assistant Examiner—D. L. Rebsch
Attorney, Agent, or Firm—Herbert Dubno

[57] ABSTRACT

An external-rotor dynamo for the rear wheel of a bicycle is pivotable about an axis parallel to its axis of rotation. The rotor is pressed toward the wheel rim by a helicoidal torsion spring secured along the axis of rotation in separate bearings. One of these bearings is angularly adjustable via a quick-acting but releasable ratchet.

10 Claims, 4 Drawing Sheets

ADJUSTABLE ROLLER DYNAMO WITH TORSION SPRING

FIELD OF THE INVENTION

The invention relates to a roller dynamo having an external rotor engageable with the wheel envelope of a bicycle, the external rotor being pivotable about an axis of rotation parallel to the rotor axis and being pressed towards the wheel envelope by a helicoidal torsion spring secured along the axis of rotation.

BACKGROUND OF THE INVENTION

In bicycle generators or dynamos, the roller envelope connected to the rotor and adapted to contact the bicycle wheel is urged towards the wheel with a contact pressure which is generated by a spring. This contact pressure must normally be sufficiently great to prevent the cylinder or the roller from slipping, even in the most adverse weather conditions. However, as a result, the contact pressure can be too great, particularly in dry weather, and unnecessary wear therefore occurs, and the user of the bicycle also may have to exert an unnecessary degree of force.

OBJECT OF THE INVENTION

The object of the invention is to improve a roller dynamo so that an optimum contact pressure is generated at all times, independently of the respective weather conditions.

SUMMARY OF THE INVENTION

This object is achieved according to the invention in that the torsion spring is secured by both ends in separate bushings or bearings, one bearing of which is adjustable in rotation.

In this roller dynamo the contact pressure can be varied by varying the spring force. This can be done easily from outside by the user, because of outer end of one of the two bearings is easily accessible. The user can therefore adapt the dynamo to the existing conditions and to his personal wishes.

The torsion spring advantageously has the dual function of exerting the torsional contact pressure and of exerting the compressional pressure for the adjustable bearing which maintains that bearing in its nonrotatable position and must be overcome in order to permit rotation of the adjustable bearing.

A device which is particularly easy to produce, reliable, compact and simple to operate is created if the rotatably adjustable bearing has a releasable fast ratchet which is adjustable in two directions of rotation. It is particularly advantageous for this purpose that the fast ratchet have a rotatably adjustable gear, the teeth of which abut immovable surfaces, in particular tooth-shaped recesses. In this case the adjustable part of the fast ratchet, in particular the gear, may also be axially slidable between the fixed position of the gear and the movable position.

It is preferable that the rotatably adjustable bearing adjustable in rotation have a cylindrical part, to the rear side of which the spring is secured, and the front side of which forms the fast ratchet. The bearings may also be located in both ends of a cylindrical passage, in particular a bore, which receives the spring between the bearings.

Particular simplicity of operation with compact construction becomes possible if the rotatably adjustable bearing adjustable in rotation has an orifice or a projection on the outside, into or onto which a tool can be fitted to actuate the bearing. It is particularly advantageous if the rotatably adjustable bearings has a spur tooth system or crown tooth system. In this case the spur tooth system or crown tooth system may form the floor of a coaxial annular groove, into which a corresponding crown wheel of the stationary bearing part extends. Excessive rotation is prevented by the fact that the part is limitedly movable in rotation by two stops on the part and counterstops on the stationary bearing part. In this case the bearing which is not rotatably adjustable may have a coaxial inwardly protruding projection which ends a few millimeters in front of the bearing part adjustable in rotation and limits the axial mobility of the bearing part adjustable in rotation.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
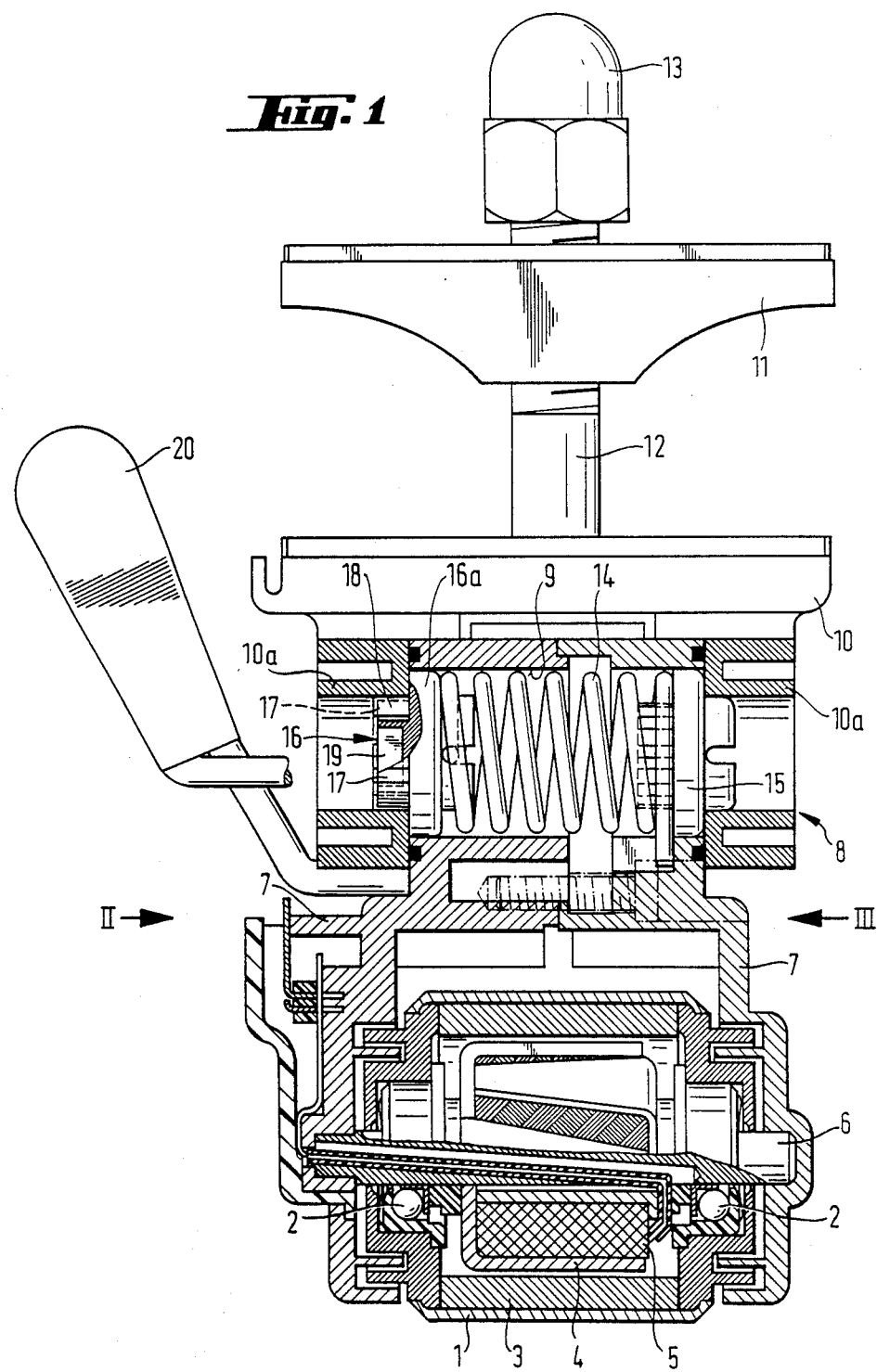
FIG. 1 is an axial section through the roller dynamo.
Figure 2:
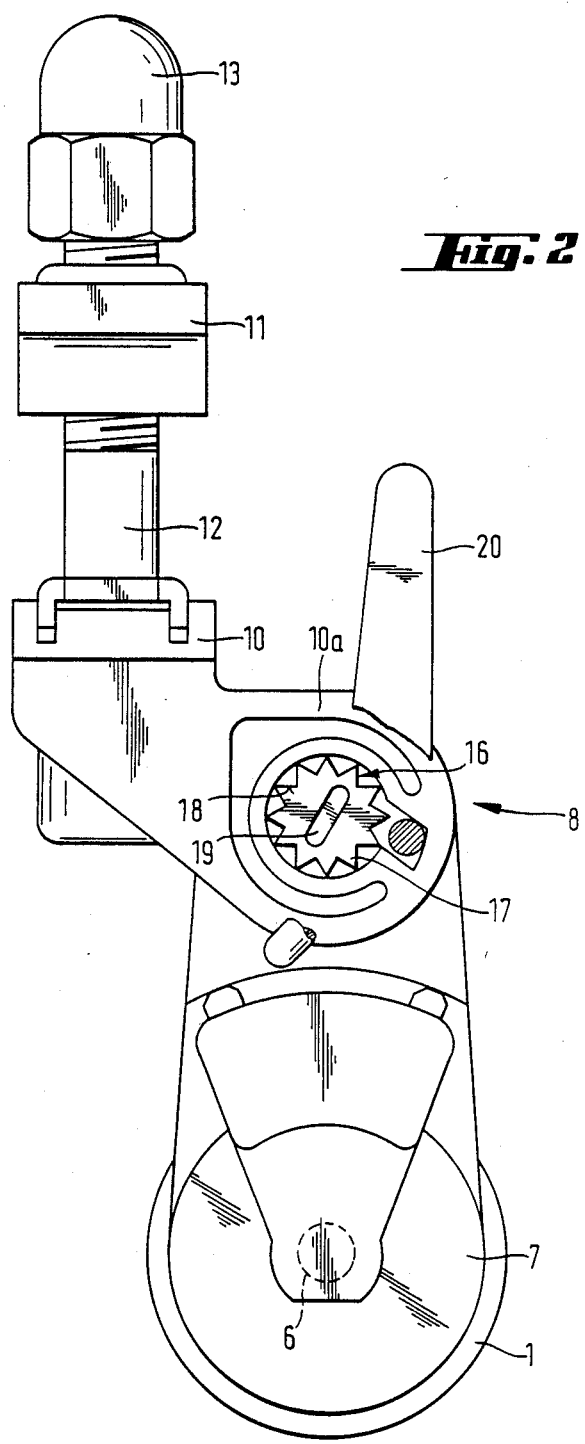
FIG. 2 is a first side elevation of the roller dynamo according to FIG. 1.
Figure 3:
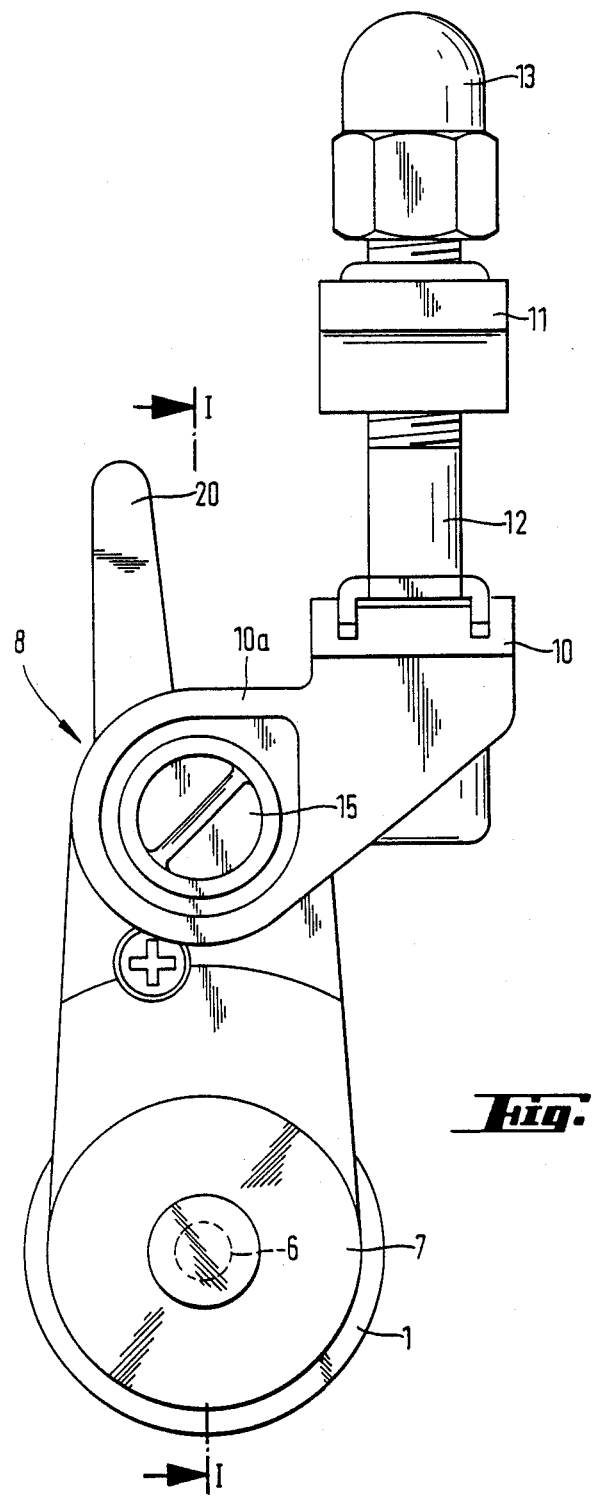
FIG. 3 is a second side elevation of the roller dynamo according to FIG. 1.

The dynamo exhibits a roller 1 which is guided by ball bearings 2 and within which the electrical generator is arranged with magnet 3, stator 4 and coil 5. The roller 1 rotates on a stator shaft 6, which is retained by a joint arm on each of two sides.

The two joint arms 7 are articulated at 8 about an axis of rotation, so that the roller 1 can be lifted away from the wheel envelope by hand. The roller is retained in the lifted state by a catch arrangement, so as to descend downwards again after the trip lever 20 is actuated. The axis of rotation of the articulation 8 is surrounded by a continuous cylindrical bore 9 about which the joint arms rotate in the inner region, and the outer regions of which on both sides are formed by cylindrical parts 10a or arms of the joint yoke 10, which is screwed to the bicycle by a securing yoke 11, a bolt 12 and a nut 13.

The bore 9 contains centrally and coaxially a helicoidal torsion spring 14 which is retained at one end by a bearing 15 fixed in rotation, which is located in the bore 9. The other end of the spring 14 is fixed to a second rotatably adjustable bearing 16 which form a releasable fast ratchet. The bearing 16 has on its outside serrations 17 which is located in a recess 18 which corresponds in shape and dimensions to the member formed with serrations 17, so that the member formed with the serrations 17 is fixed against rotation when it is located in the recess 18 of the respective cylindrical part 10a. The second bearing 16 can be slid inwards counter to the pressure of the spring 14, and can then be rotated within the bore 9. The torsion force of the spring is then modified. As soon as the axial thrust upon the bearing 16 is ended, it reengages in the recess 18 and cannot rotate relative to the cylindrical portion in which it is received.

For the operation of the bearing 16 and, therefore the variation of the torsion force of the spring 14, the bearing 16 is formed centrally with a recess or orifice 19 into which a spanner or screwdriver can be inserted for operation.

Figure 4:
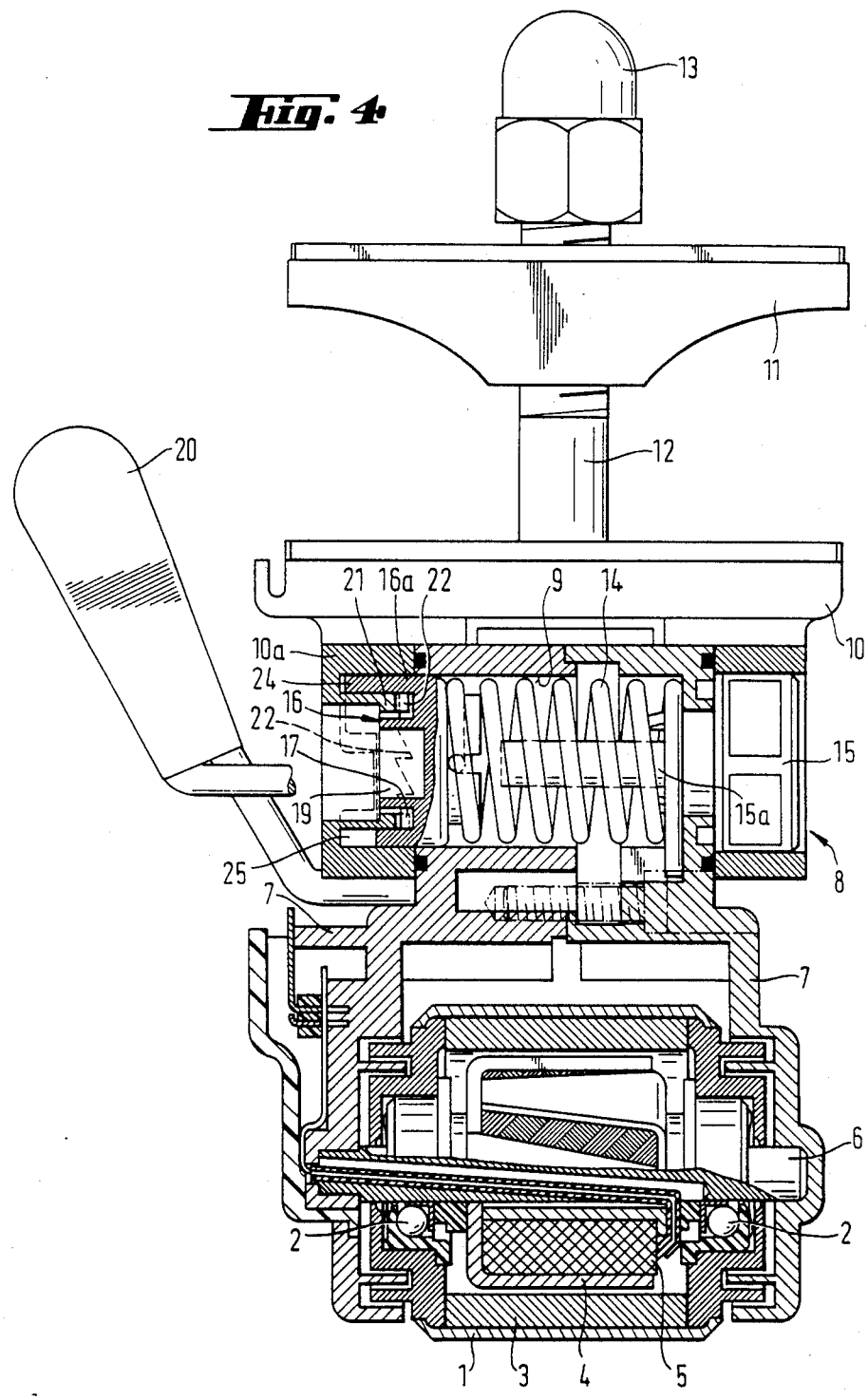
FIG. 4 is an axial section through a second embodiment.

In the case of the rotatably adjustable bearing 16, the rotatable part 16a is rotationally symmetrical, in particular cylindrical. The part 16a either has a spur tooth system, corresponding to the exemplary embodiment in FIG. 1, so that it is located in a corresponding circular recess with a female tooth system of the stationary part 10a, or else the part 16a exhibits a crown tooth system 22, which forms the floor of a coaxial annular groove 23, FIG. 4. A crown wheel 21, which projects on the stationary part 10a, projects into the annular groove 23.

The degree of rotational adjustability of the part 16a can be limited in both exemplary embodiments. Stops are provided on the part 16a, and counterstops on the part 10a, for this purpose. The stops on the part 16a are preferably formed by the sector of a projecting coaxial annular part 24 which protrudes into a coaxial annular groove 25 of the stationary part 10a. In this case the floor of the annular groove 25 projects in a region in order to form the counterstops.

On the bearing part 15, which is not adjustable in rotation, a pin 15a projects coaxially inwards, which ends just in front of the part 16a, so that the part 16a can be pressed inwards only by a few millimeters, so that, although the tooth system can be brought out of engagement, stops and counterstops of the parts 10a and 16a still remain engaged.

I claim:
1. A roller generator for a bicycle, comprising:
   a support having a median plane and being operatively connected with a bicycle, said support provided with a cylindrical bore traversing said support along a pivoting axis perpendicular to said median plane, the support being formed with:
   a first cylindrical lug coaxial with said bore,
   a second cylindrical lug coaxial with said bore and spaced from said first lug along said pivoting axis, said second lug being formed with a cavity having an inner peripheral surface, said surface provided with uniformly spaced apart formations,
   a first bearing axially fixed in said first lug in said bore,
   a second bearing having means for engaging with said formations, said second bearing axially movable along said pivoting axis in said bore, and
   a torsion spring biased between said first and second bearings, so that said torsion spring being wound up by externally actuated axially movable second bearing pushes said second bearing back to said second lug upon termination of the external actuation for an angularly engaging said means for engaging with said formations at selective angular positions; and
   a rotor operatively connected with said torsion spring and rotatable about an axis of rotation parallel to said pivoting axis, so that said rotor presses a tire of the bicycle with a force induced by said torsion spring and dependent upon said certain angular positions defining the angular engagement of said means for engaging with said formations.

2. The generator defined in claim 1, further comprising means for lifting said rotor up to a nonoperational position.

3. The generator defined in claim 1 wherein said means for engaging are a spur tooth system adjustable in both directions of the rotation of said second bearing.

4. The generator defined in claim 1 wherein said formations are tooth shaped recesses.

5. The generator defined in claim 1 wherein said second lug is provided with a channel for an insertion of means for actuating said second bearing.

6. The generator defined in claim 1 wherein said means for engaging are a crown tooth system.

7. The generator defined in claim 1, further comprising a pin attached to said first bearing, said pin extending along said pivoting axis in said bore and terminating at a distance from said second bearing limiting the axial movement of said second bearing.

8. A roller dynamo comprising:
   a support adapted to be mounted on a bicycle proximal to a bicycle wheel;
   a housing pivotally mounted on said support to swing about an axis toward and away from said wheel;
   a roller rotatable on said housing and connected to an electric current generator in said housing engageable with said wheel and rotated thereby to drive said generator; and
   means for adjusting a force with which said roller is pressed against said wheel and comprising:
   a pair of bearing members axially spaced along said axis including an angularly adjustable bearing member and another bearing member,
   a torsion spring between said bearing members and having one end engaged by said adjustable bearing member and another end coupled to said housing at said other bearing member,
   means forming an orifice opening axially toward said adjustable bearing member in said support and provided with formations angularly engageable with complementary formations provided on said adjustable bearing member whereby said adjustable bearing member is restrained against rotation by engagement of said formations, said bearing member being axially shiftable upon application of an axial force through said orifice to disengage said formations and permit rotation of said adjustable member to rotationally alter a torsion force generated by said spring, said formations reengaging to set the adjusted rotational force upon release of said axial force,
   a stop formed on said other bearing member limiting axial displacement of said adjustable bearing member toward said other bearing member, and
   stops and counterstops on said adjustable member and said support limiting the angular displacement of said adjustable member relative to said support while said adjustable member is axially displaced.

9. The roller dynamo defined in claim 8 wherein said formations include a releasable fast ratchet provided on said adjustable member and having teeth engageable with corresponding teeth around said orifice.

10. The roller dynamo defined in claim 8 wherein said support is provided with a recess having teeth on a floor of said recess around said orifice and said formations on said adjustable member are constituted by crown gear teeth.

* * * * *